United States Patent
Funakoshi et al.

(10) Patent No.: US 9,382,859 B2
(45) Date of Patent: Jul. 5, 2016

(54) CONTROL DEVICE FOR MOTOR VEHICLE

(75) Inventors: Hiroshi Funakoshi, Okazaki (JP);
Hiroyuki Suzuki, Nagoya (JP);
Katsuyoshi Noda, Nagoya (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 324 days.

(21) Appl. No.: 13/423,324

(22) Filed: Mar. 19, 2012

(65) Prior Publication Data

US 2012/0316740 A1 Dec. 13, 2012

(30) Foreign Application Priority Data

Jun. 9, 2011 (JP) ................................ 2011-129065

(51) Int. Cl.
| | |
|---|---|
| F02D 41/02 | (2006.01) |
| B60W 10/06 | (2006.01) |
| B60W 10/11 | (2012.01) |
| B60W 30/18 | (2012.01) |
| F02D 41/04 | (2006.01) |
| F02N 11/08 | (2006.01) |

(52) U.S. Cl.
CPC .......... *F02D 41/0225* (2013.01); *B60W 10/06* (2013.01); *B60W 10/11* (2013.01); *B60W 30/18054* (2013.01); *F02D 41/042* (2013.01); *F02N 11/0818* (2013.01); *F02N 11/0825* (2013.01); *F02N 2200/023* (2013.01); *F02N 2200/061* (2013.01); *F02N 2200/0806* (2013.01); *F02N 2200/124* (2013.01); *Y02T 10/48* (2013.01)

(58) Field of Classification Search
CPC ... Y02T 10/48; F16H 63/483; F16H 2312/12; Y10T 477/65; F02D 41/0225; F02D 41/042; B60W 10/06; B60W 10/11; B60W 30/18054; F02N 11/0818

USPC ............................................................ 701/54
See application file for complete search history.

(56) References Cited

U.S. PATENT DOCUMENTS 6,411,881 B1 * 6/2002 Thomas ........................ 701/67
6,926,639 B2 * 8/2005 Hopper ......................... 477/110
(Continued)

FOREIGN PATENT DOCUMENTS

| | | |
|---|---|---|
| EP | 1 659 285 A2 | 5/2006 |
| EP | 1 707 803 A2 | 10/2006 |

(Continued)

OTHER PUBLICATIONS

European Search Report dated Sep. 3, 2012.

*Primary Examiner* — Fadey Jabr
*Assistant Examiner* — Basil T Jos
(74) *Attorney, Agent, or Firm* — Birch, Stewart, Kolasch & Birch, LLP (57) ABSTRACT

A motor vehicle to which a control device is applied includes an idling stop control section for stopping operation of an engine when a predetermined stopping condition is fulfilled while the engine is idling, and a neutral-at-idle control section for shifting a transmission of the vehicle into neutral when a predetermined shift-into-neutral condition is fulfilled. While a post-stoppage elapsed time measured by a timer is shorter than or equal to a predetermined time after the vehicle stops moving, operation of the engine is stopped by the idling stop control section if the predetermined stopping condition is fulfilled but shifting of the transmission into neutral by the neutral-at-idle control section is prohibited even if the shift-into-neutral condition is fulfilled.

9 Claims, 8 Drawing Sheets

(56) References Cited

U.S. PATENT DOCUMENTS

| | | | |
|---|---|---|---|
| 2009/0111649 A1* | 4/2009 | Hecht et al. | 477/92 |
| 2010/0038158 A1* | 2/2010 | Whitney | B60K 6/365 180/65.265 |
| 2010/0300383 A1* | 12/2010 | Pursifull et al. | 123/21 |
| 2011/0077830 A1 | 3/2011 | Lochocki, Jr. et al. | |

FOREIGN PATENT DOCUMENTS

| | | |
|---|---|---|
| JP | 2000-97065 A | 4/2000 |
| JP | 2006-161684 A | 6/2006 |
| JP | 2009-264513 A | 11/2009 |
| JP | 2010-48164 A | 3/2010 |
| JP | 2010281398 A * | 12/2010 |

* cited by examiner

CONTROL DEVICE FOR MOTOR VEHICLE

BACKGROUND OF THE INVENTION

1. Field of the Invention

The present invention relates to control devices for motor vehicles, and more particularly, to techniques for improving fuel efficiency of a motor vehicle provided with an idling stop controller and a neutral-at-idle controller.

2. Description of the Related Art

An idling stop controller has conventionally been known as a means of improving fuel efficiency of a motor vehicle, whereby the operation of an internal combustion engine is stopped when the vehicle stops moving such as at an intersection.

When a predetermined stopping condition is fulfilled as in a situation where the vehicle is standing at an intersection, for example, the idling stop controller automatically stops the idling of the engine. When a predetermined restarting condition is fulfilled thereafter, the idling stop controller restarts the engine so that the vehicle can be moved.

There has also been known a neutral-at-idle controller as a means of improving fuel efficiency of a vehicle.

When a predetermined shift-into-neutral condition is fulfilled during idling of the engine, the neutral-at-idle controller automatically shifts the transmission into neutral, to thereby improve fuel efficiency during idling.

There has been proposed a motor vehicle which is provided with both the idling stop controller and the neutral-at-idle controller and in which these controllers are selectively operated in accordance with the gradient of the road surface (Japanese Laid-open Patent Publication No. 2009-264513). For example, if the gradient of the road surface is relatively small, the idling stop controller is selected, and if the gradient of the road surface is relatively large, the neutral-at-idle controller is selected. Such a control method permits the fuel efficiency to be satisfactorily improved by the idling stop controller when the gradient of the road surface is relatively small, and to avoid stoppage of the engine and restrain lowering of the brake pressure when the gradient of the road surface is relatively large.

In the case of motor vehicles provided with both the idling stop controller and the neutral-at-idle controller like the one disclosed in the aforementioned publication, the stopping condition for activating the idling stop controller includes a conditional state which, when fulfilled, causes no problem regarding restart of the engine even if the engine is stopped, such as the state of charge of battery. Generally, therefore, the stopping condition is less likely to be fulfilled than the shift-into-neutral condition.

As a consequence, a situation occasionally arises wherein, immediately after the vehicle is stopped, the shift-into-neutral condition is fulfilled first, so that shifting into neutral is executed, and then the stopping condition is fulfilled, followed by automatic stop of the engine. If such a switchover of control mode from the neutral-at-idle controller to the idling stop controller takes place, a time lag is caused by the switchover, and thus it is difficult to execute automatic stop of the engine in a moment even if the stopping condition is fulfilled immediately after the shift-into-neutral condition is fulfilled. A problem therefore arises in that automatic engine stop by the idling stop controller, which provides a superior fuel efficiency improving effect, fails to be promptly executed immediately after the vehicle is stopped.

SUMMARY OF THE INVENTION

An object of the present invention is to provide a control device for a motor vehicle provided with an idling stop controller and a neutral-at-idle controller, whereby fuel efficiency can be effectively improved.

To achieve the object, the present invention provides a control device for a motor vehicle provided with an idling stop controller for stopping operation of an internal combustion engine mounted as a drive source on the vehicle when a predetermined stopping condition is fulfilled, and a neutral-at-idle controller for shifting a transmission of the vehicle into neutral when a predetermined shift-into-neutral condition is fulfilled. The control device comprises a standing time measuring unit configured to measure an elapsed time elapsed after the vehicle stops moving, wherein, while the elapsed time measured by the standing time measuring unit is shorter than or equal to a predetermined time set beforehand, operation of the engine is stopped by the idling stop controller if the predetermined stopping condition is fulfilled but shifting of the transmission into neutral by the neutral-at-idle controller is prohibited even if the predetermined shift-into-neutral condition is fulfilled.

In this manner, while the time elapsed from the stoppage of the vehicle is shorter than or equal to the predetermined time, operation of the engine is stopped by the idling stop controller if the predetermined stopping condition is fulfilled but the execution of control by the neutral-at-idle controller is prohibited even if the predetermined shift-into-neutral condition is fulfilled. Accordingly, when the stopping condition and the shift-into-neutral condition are both fulfilled immediately after the vehicle is stopped, engine stop control can be executed smoothly by the idling stop controller without neutral-at-idle control being executed by the neutral-at-idle controller. The engine stop control by the idling stop controller, which provides a superior fuel efficiency improving effect, can therefore be promptly executed immediately after the stoppage of the vehicle, making it possible to improve fuel efficiency.

BRIEF DESCRIPTION OF THE DRAWINGS

The present invention will become more fully understood from the detailed description given hereinafter and the accompanying drawings which are given by way of illustration only, and thus, are not limitative of the present invention, and wherein.

DETAILED DESCRIPTION OF THE INVENTION

An embodiment of the present invention will be hereinafter described with reference to the accompanying drawings.

Figure 1:
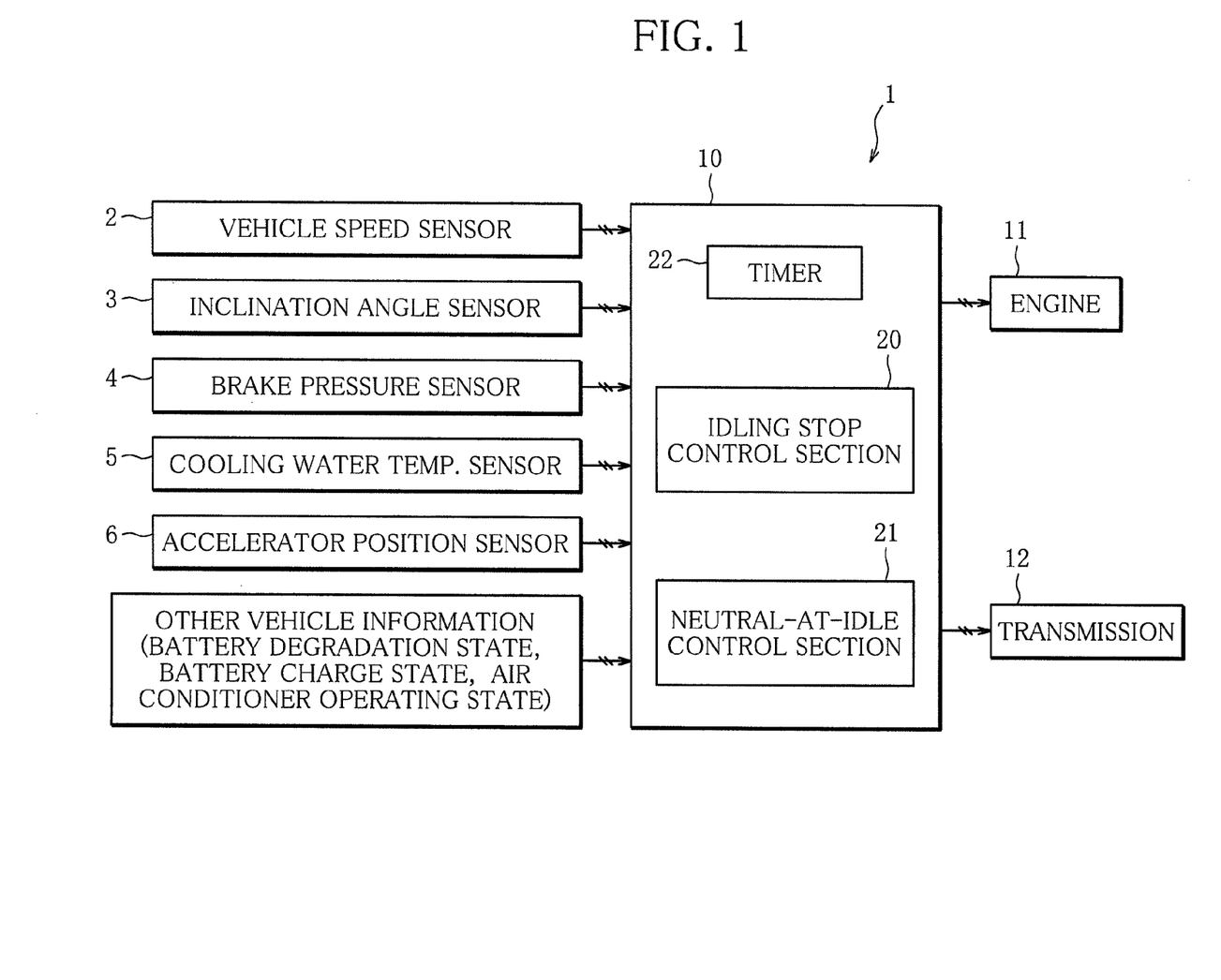
FIG. 1 illustrates a schematic configuration of a control device for a motor vehicle according to an embodiment of the present invention.

FIG. 1 illustrates the configuration of a control device 1 for a motor vehicle according to the embodiment of the present invention.

The motor vehicle to which the control device 1 of the present invention is applied is provided with an idling stop controller and a neutral-at-idle controller, both known in the art, with a view to improving fuel efficiency.

The idling stop controller is configured to automatically stop the operation of an engine 11 (internal combustion engine) when a predetermined idling stop condition (stopping condition) is fulfilled (idling stop control), such as when the vehicle stops moving at an intersection, and to automatically start the engine 11 to allow the vehicle to move when a predetermined restarting condition is fulfilled thereafter.

The idling stop condition requires, as basic initiation requisites, that the vehicle speed is "0" and that the brake (service brake of the vehicle) is ON (applied). In addition, hydraulic operating fluid pressure of the brake, engine temperature, state of battery, demand for operation of air conditioner, accelerator position and the like are set as items of the idling stop condition.

The neutral-at-idle controller is configured to automatically shift a transmission 12 into neutral during idling when a predetermined shift-into-neutral condition is fulfilled (neutral-at-idle control), such as while the vehicle is standing at an intersection.

The shift-into-neutral condition requires, as basic initiation requisites, that the vehicle speed is "0" and that the brake is ON, and in addition, the hydraulic operating fluid pressure of the brake, the engine temperature, the accelerator position and the like are set as items of the shift-into-neutral condition.

The number of items set with respect to the idling stop condition is greater than that set with respect to the shift-into-neutral condition, so that the idling stop condition is less likely to be fulfilled than the shift-into-neutral condition. This is because the idling stop control differs from the neutral-at-idle control in that the engine is stopped, and has to ensure operation of the brake and the like even while the engine is stopped. The idling stop control, on the other hand, is superior in the fuel efficiency improving effect to the neutral-at-idle control.

According to the embodiment, as illustrated in FIG. 1, the vehicle is provided with a vehicle speed sensor 2 for detecting the vehicle speed, an inclination angle sensor 3 (road surface gradient detector) for detecting an inclination angle of the vehicle as a road surface gradient θ, a brake pressure sensor 4 for detecting hydraulic pressure P in the master cylinder of the service brake of the vehicle, a cooling water temperature sensor 5 for detecting the temperature of cooling water of the engine 11, an accelerator position sensor 6 for detecting the position of an accelerator pedal of the vehicle, and an electronic control unit (hereinafter referred to as ECU 10) including control sections associated with the idling stop controller and the neutral-at-idle controller, respectively.

The ECU 10 includes input/output devices, storage devices (ROM, RAM, nonvolatile RAM, and the like), and a central processing unit (CPU).

The ECU 10 is electrically connected at its input side with the vehicle speed sensor 2, the inclination angle sensor 3, the brake pressure sensor 4 and the cooling water temperature sensor 5 to be input with information detected by these sensors. In addition, the ECU 10 is input with a variety of vehicle information related to the idling stop condition and the shift-into-neutral condition, such as the state of degradation of the battery of the vehicle, the state of charge of the battery, and the state of a switch for operating the air conditioner.

Also, the ECU 10 is connected at its output side with the engine 11 and the transmission 12 to control the operation of the engine 11 and of the transmission 12.

The ECU 10 further includes an idling stop control section 20 (idling stop controller) as the control section for the idling stop controller, a neutral-at-idle control section 21 as the control section for the neutral-at-idle controller, and a timer 22 (standing time measuring unit).

The timer 22 has the function of measuring a post-stoppage elapsed time Ts, which is a length of time elapsed after the vehicle stops moving.

The ECU 10 controls execution and cancellation of the idling stop control and the neutral-at-idle control in accordance with the aforementioned various information input thereto.

Especially, in this embodiment, the ECU 10 has the function of switching control mode between the idling stop control and the neutral-at-idle control in accordance with the post-stoppage elapsed time Ts.

Figure 2:
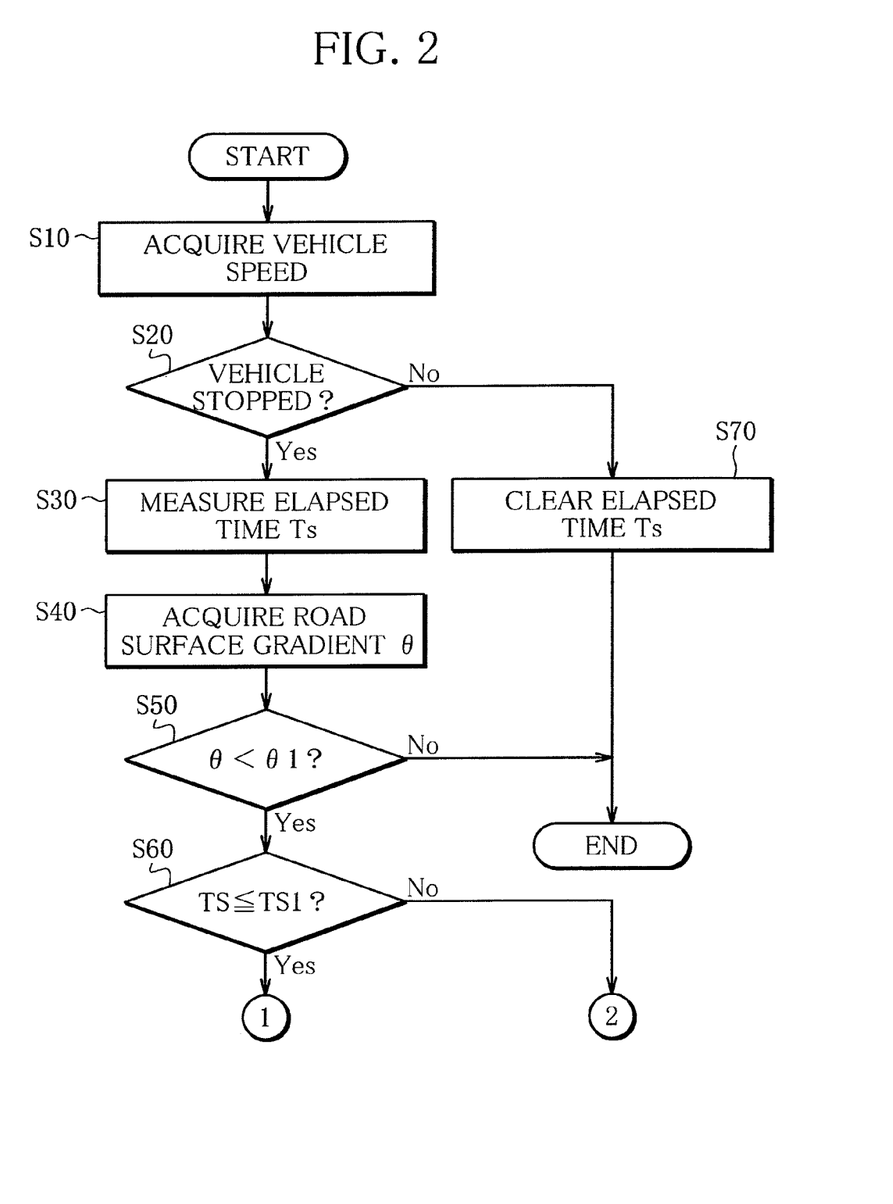
FIG. 2 is a flowchart illustrating a procedure for determining execution and cancellation of idling stop control and neutral-at-idle control.
Figure 3:
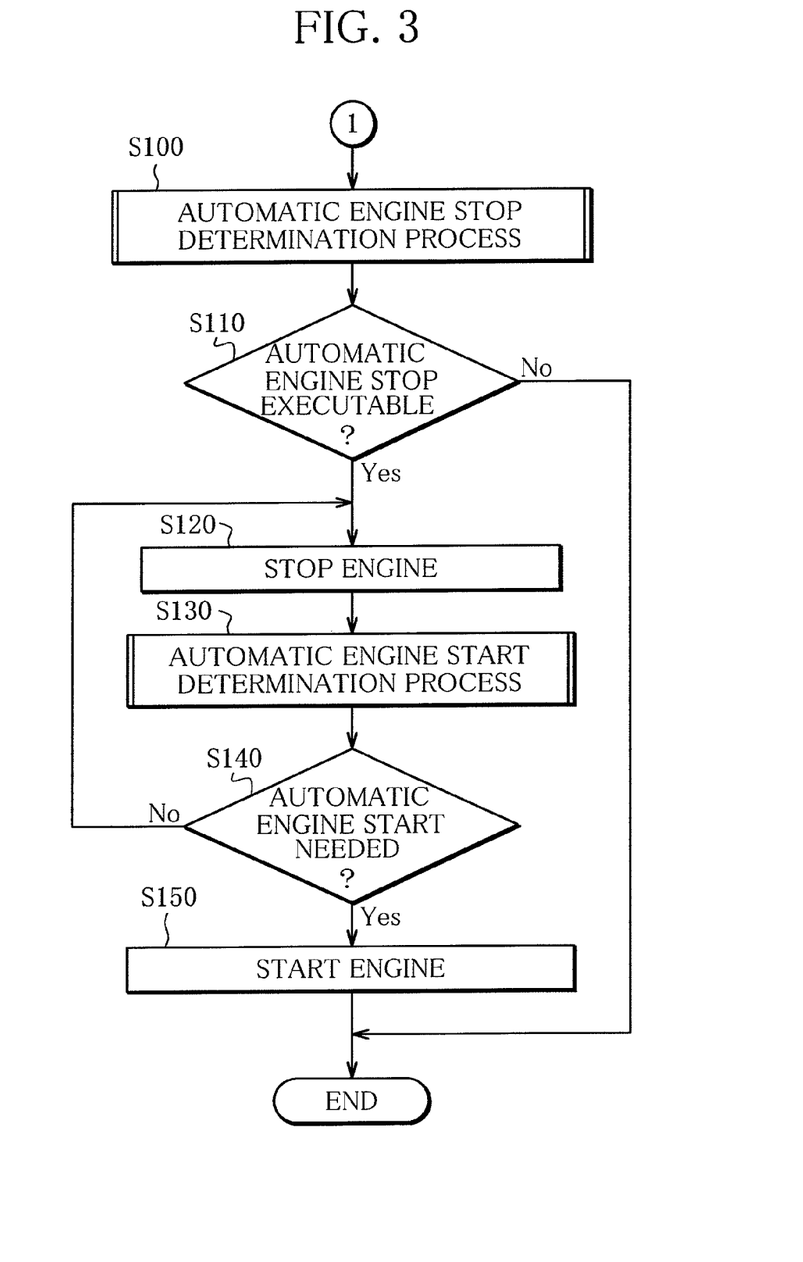
FIG. 3 is a flowchart illustrating the procedure for determining execution and cancellation of the idling stop control and the neutral-at-idle control.
Figure 4:
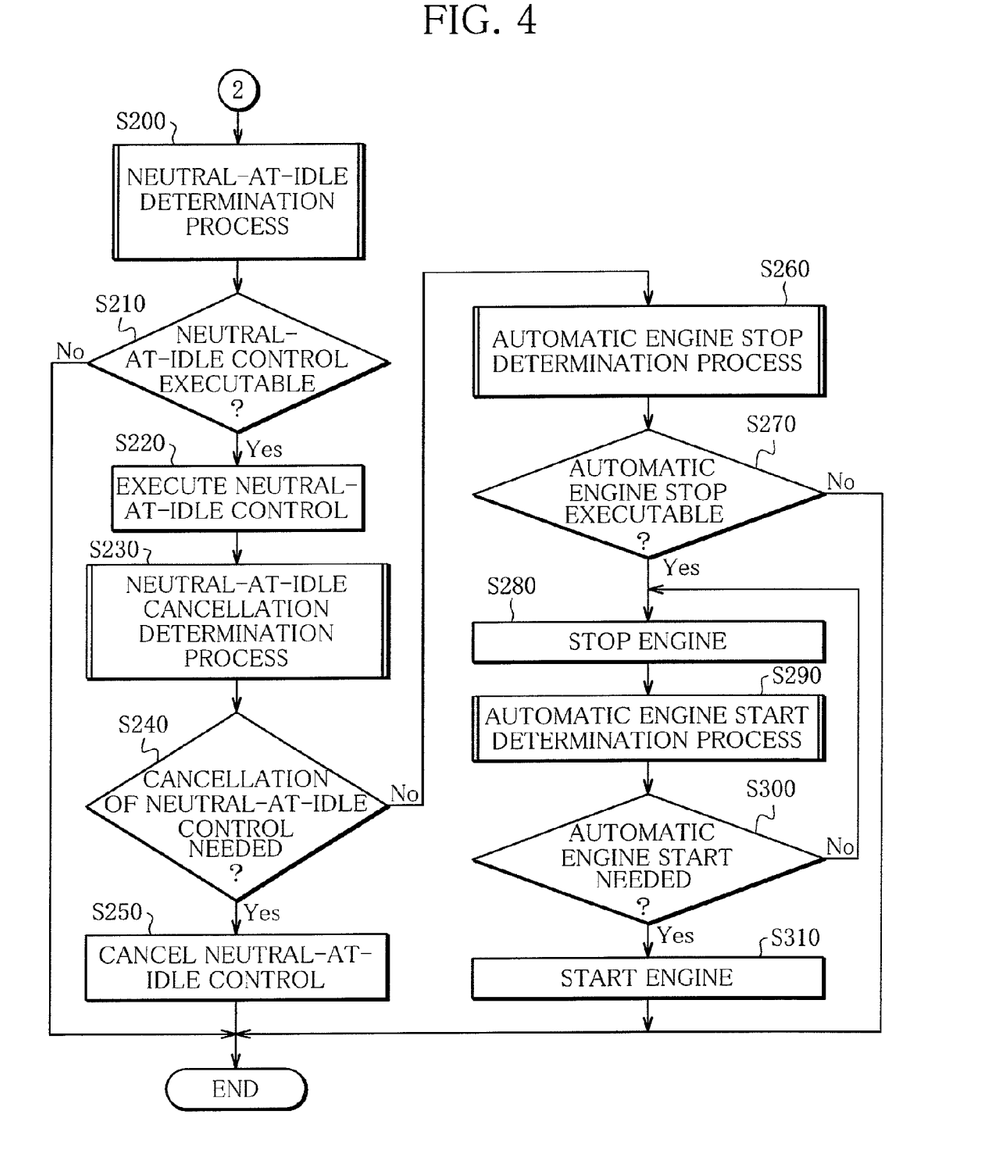
FIG. 4 is a flowchart also illustrating the procedure for determining execution and cancellation of the idling stop control and the neutral-at-idle control.

FIGS. 2 to 4 are flowcharts illustrating a main routine executed by the ECU 10 to make determination as to execution and cancellation of the idling stop control and the neutral-at-idle control. In particular, FIG. 3 illustrates a procedure for making determination as to execution and cancellation of the idling stop control when the post-stoppage elapsed time Ts is shorter than or equal to a predetermined time Ts1, and FIG. 4 illustrates a procedure for making determination as to execution and cancellation of the idling stop control and the neutral-at-idle control when the predetermined time Ts1 is exceeded by the post-stoppage elapsed time Ts.

Figure 5:
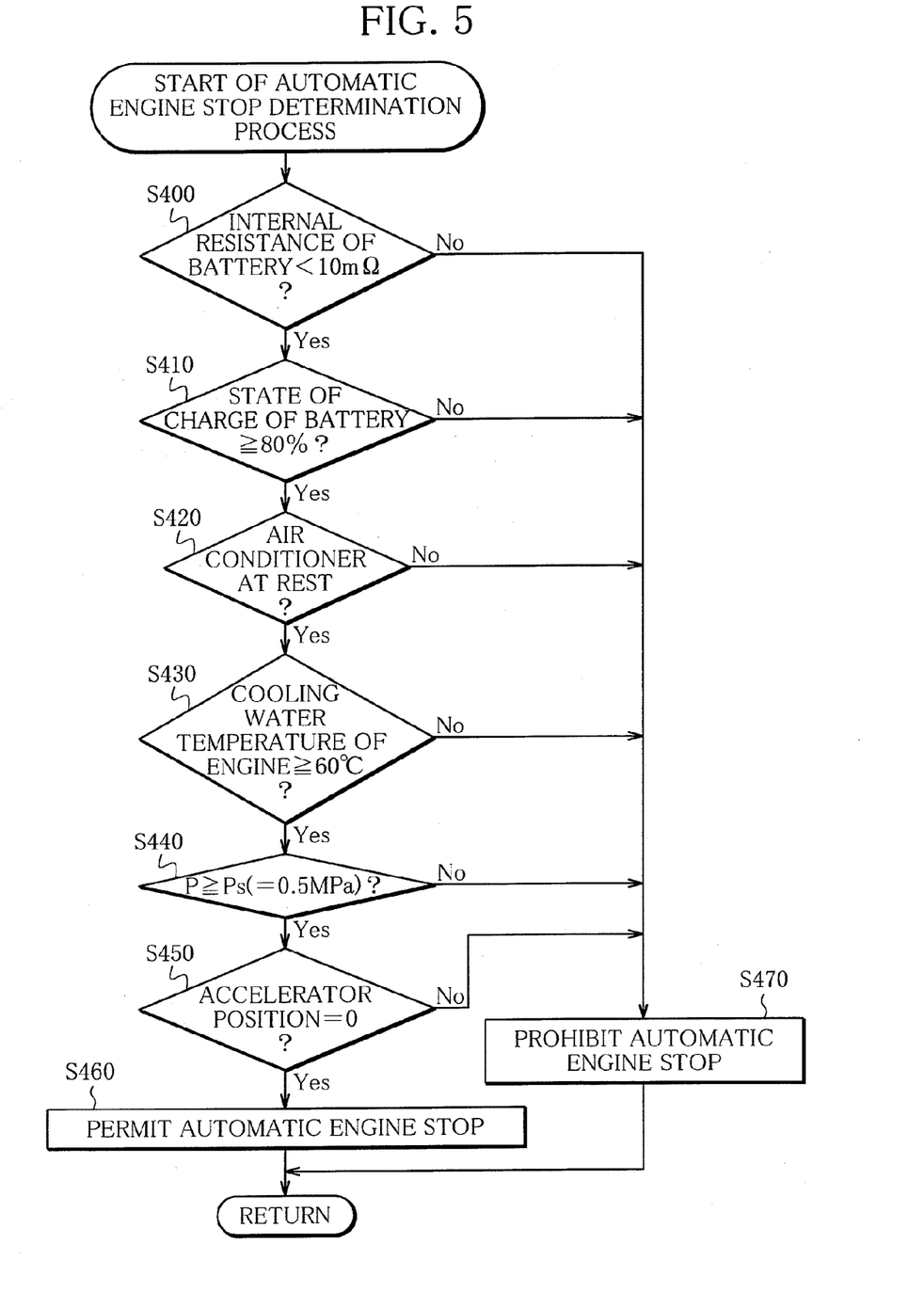
FIG. 5 is a flowchart illustrating a subroutine for an automatic engine stop determination process.
Figure 6:
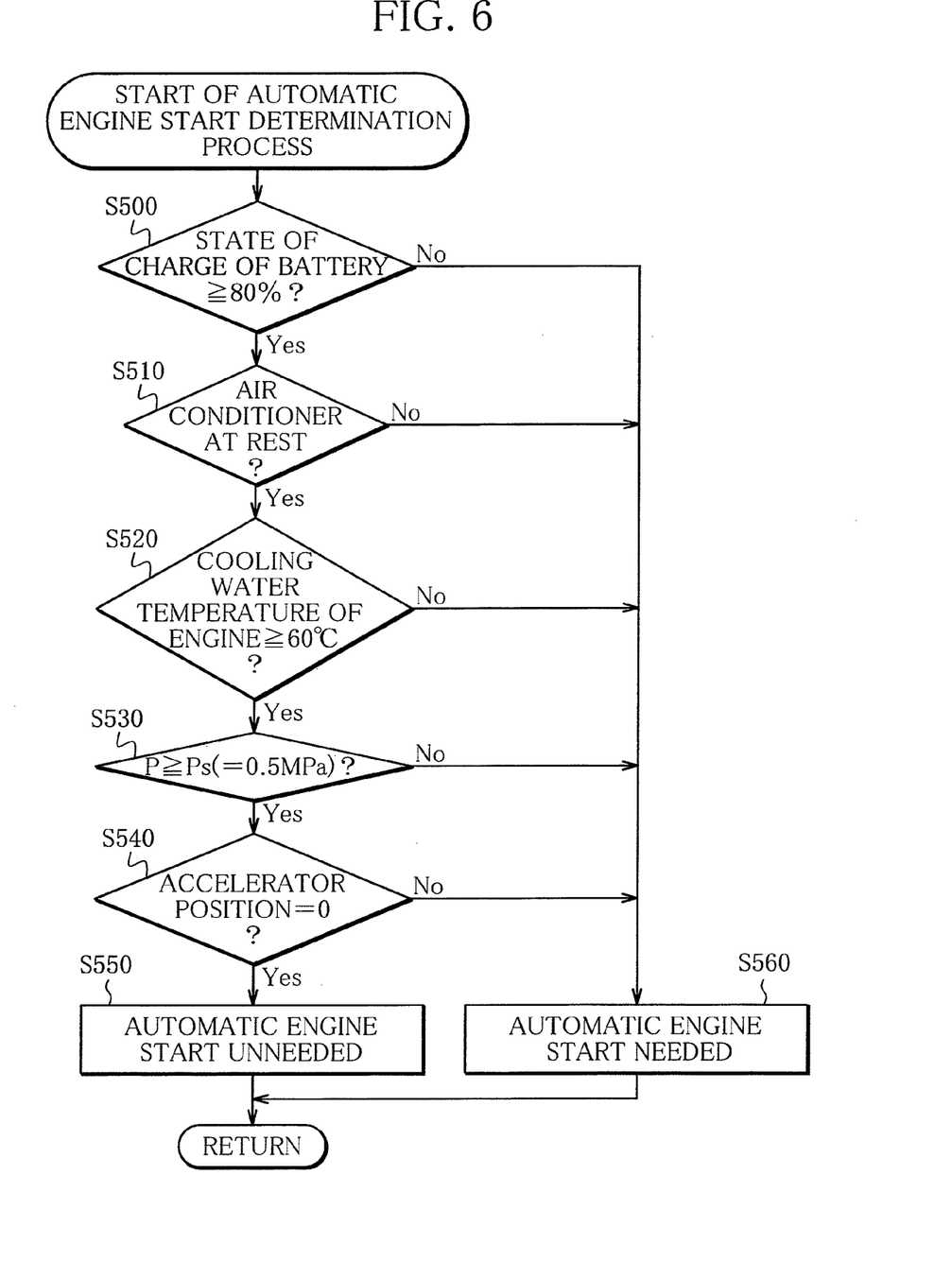
FIG. 6 is a flowchart illustrating a subroutine for an automatic engine start determination process.
Figure 7:
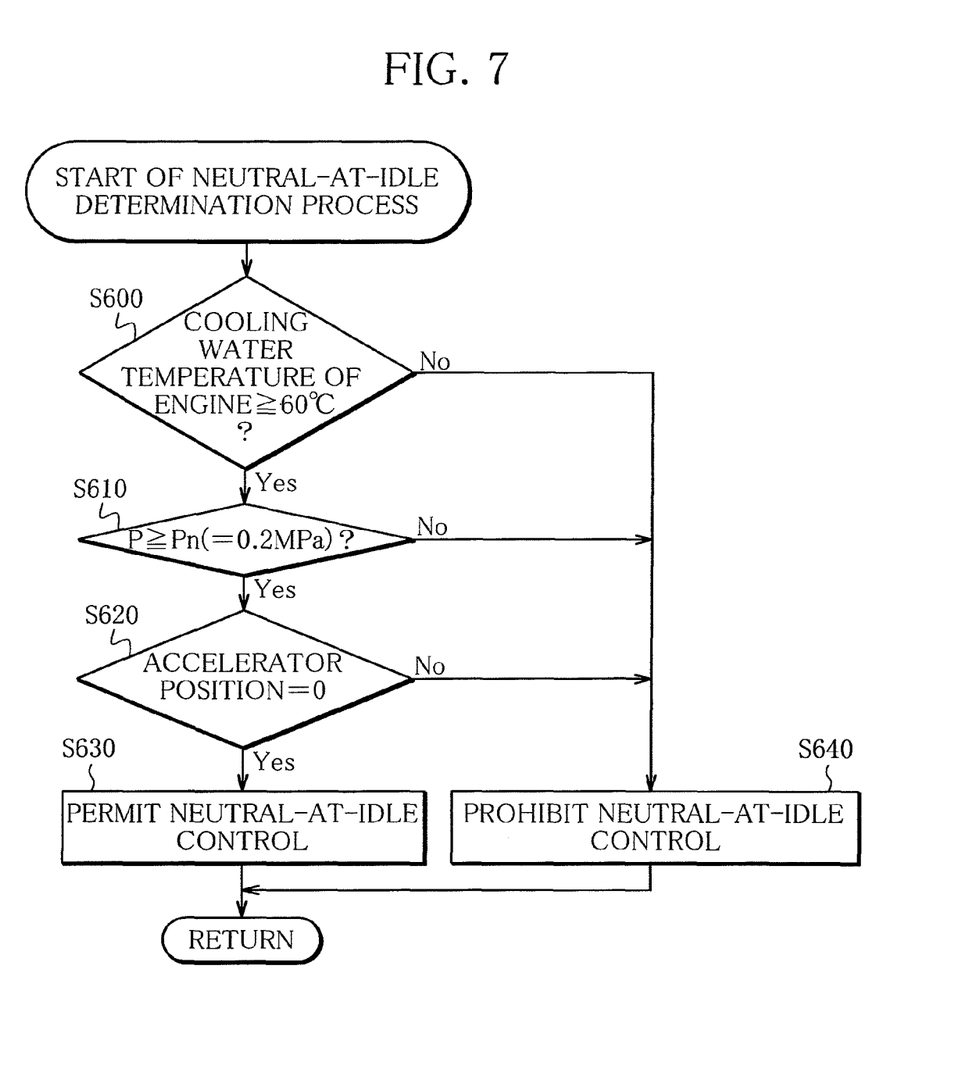
FIG. 7 is a flowchart illustrating a subroutine for a neutral-at-idle determination process.
Figure 8:
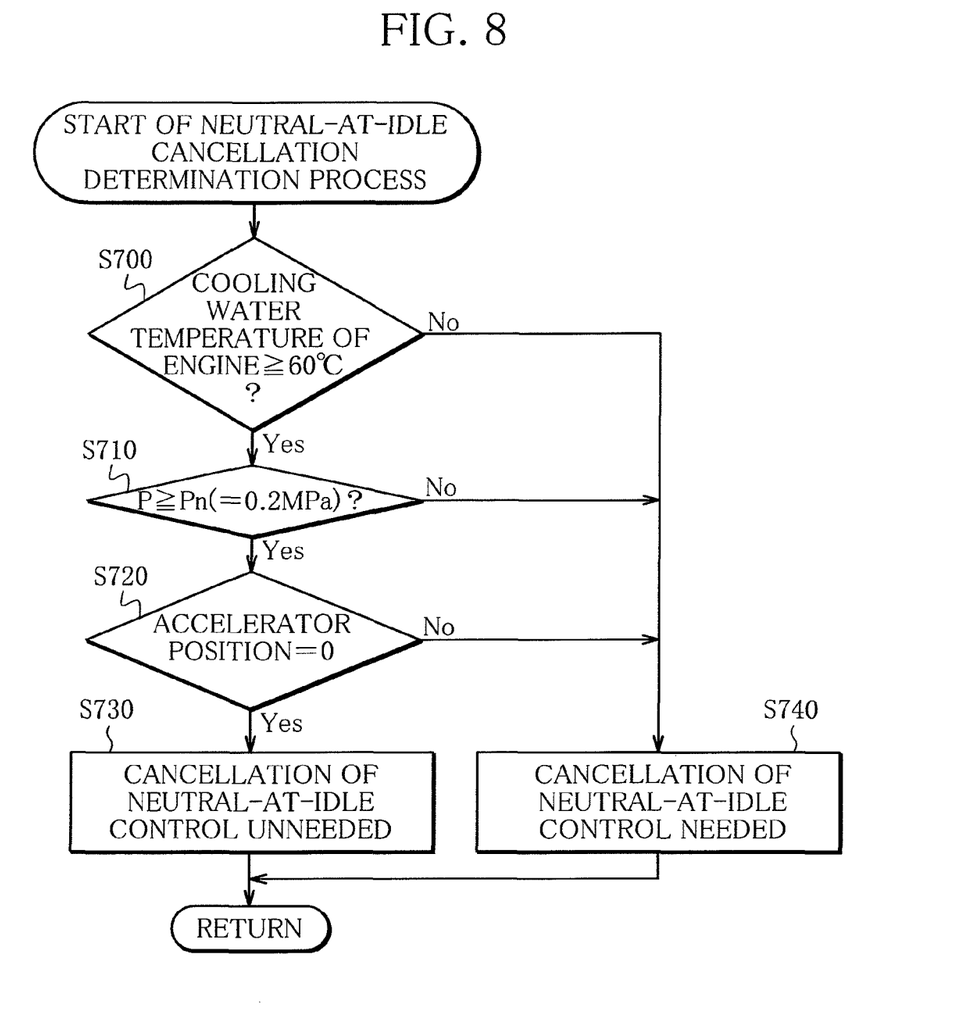
FIG. 8 is a flowchart illustrating a subroutine for a neutral-at-idle cancellation determination process.

FIG. 5 is a flowchart illustrating a subroutine for an automatic engine stop determination process, FIG. 6 is a flowchart illustrating a subroutine for an automatic engine start determination process, FIG. 7 is a flowchart illustrating a subroutine for a neutral-at-idle determination process, and FIG. 8 is a flowchart illustrating a subroutine for a neutral-at-idle cancellation determination process.

The main routine and the subroutines are repeatedly executed while the power supply to the vehicle is ON.

First, in Step S10 in FIG. 2, the vehicle speed is acquired from the vehicle speed sensor 2, and the routine proceeds to Step S20.

In Step S20, it is determined on the basis of the vehicle speed input in Step S10 whether or not the vehicle is being stopped. Specifically, whether the vehicle is being stopped or not is judged by making a determination as to whether or not the vehicle speed is "0", or whether or not the vehicle speed assumes a value smaller than or equal to a preset value close to "0". If the vehicle is being stopped, the routine proceeds to Step S30; if the vehicle is not being stopped, the routine proceeds to Step S70.

In Step S30, the timer 22 is started to measure the post-stoppage elapsed time Ts, which is a length of time elapsed after the vehicle is stopped. The routine then proceeds to Step S40.

In Step S40, the road surface gradient θ is acquired from the inclination angle sensor 3, and the routine proceeds to Step S50.

In Step S50, it is determined whether or not the road surface gradient θ input in Step S40 is smaller than a predetermined gradient θ1. The predetermined gradient θ1 is within a range of gradient in which the idling stop control and the neutral-at-idle control can be executed, and may be set to a value close to an upper-limit value of the gradient range. If the road surface gradient θ is smaller than the predetermined gradient θ1, the routine proceeds to Step S60; if the road surface gradient θ is greater than or equal to the predetermined gradient θ1, the routine ends.

In Step S60, it is determined whether or not the post-stoppage elapsed time Ts measured in Step S30 indicates a time length shorter than or equal to the predetermined time Ts1. The predetermined time Ts1 may be set appropriately so that the driver may have time enough to perform predetermined manipulation for the subsequent idling stop after the vehicle is stopped. If the post-stoppage elapsed time Ts is shorter than or equal to the predetermined time Ts1, the routine proceeds to Step S100 in FIG. 3; if the post-stoppage elapsed time Ts is longer than the predetermined time Ts1, the routine proceeds to Step S200 in FIG. 4.

In Step S70, the post-stoppage elapsed time Ts is cleared to "0", whereupon the routine ends.

In Step S100 in FIG. 3, the subroutine for the automatic engine stop determination process, illustrated in FIG. 5, is executed to determine whether or not the engine may be automatically stopped by the idling stop control. Then, the routine proceeds to Step S110.

If, as a result of the process executed in Step S100, it is judged in Step S110 that the engine may be automatically stopped, the routine proceeds to Step S120. On the other hand, if it is judged that the engine should not be automatically stopped, the routine ends.

In Step S120, automatic stop of the engine is executed by the idling stop control section 20, and the routine then proceeds to Step S130.

In Step S130, the subroutine for the automatic engine start determination process, illustrated in FIG. 6, is executed to determine whether or not the engine needs to be automatically started from the idling stop state. The routine then proceeds to Step S140.

If, as a result of the process executed in Step S130, it is judged in Step S140 that the engine needs to be automatically started, the routine proceeds to Step S150. On the other hand, if it is judged that the engine need not be automatically started, the routine returns to Step S120.

In Step S150, automatic start of the engine is executed by the idling stop control section 20, whereupon the routine ends.

In Step S200 in FIG. 4, the subroutine for the neutral-at-idle determination process, illustrated in FIG. 7, is executed to determine whether the neutral-at-idle control may be executed or not. Then, the routine proceeds to Step S210.

If, as a result of the process executed in Step S200, it is judged in Step S210 that the neutral-at-idle control may be executed, the routine proceeds to Step S220. On the other hand, if it is judged that the neutral-at-idle control should not be executed, the routine ends.

In Step S220, the neutral-at-idle control is executed by the neutral-at-idle control section 21, and the routine proceeds to Step S230.

In Step S230, the subroutine for the neutral-at-idle cancellation determination process, illustrated in FIG. 8, is executed to determine whether or not the neutral-at-idle control needs to be cancelled. Then, the routine proceeds to Step S240.

If, as a result of the process executed in Step S230, it is judged in Step S240 that the neutral-at-idle control needs to be cancelled, the routine proceeds to Step S250. On the other hand, if it is judged that the neutral-at-idle control need not be cancelled, the routine proceeds to Step S260.

In Step S250, the neutral-at-idle control executed by the neutral-at-idle control section 21 is cancelled, whereupon the routine ends.

In Step S260, the subroutine for the automatic engine stop determination process, illustrated in FIG. 5, is executed to determine whether or not the engine may be automatically stopped by the idling stop control. The routine then proceeds to Step S270.

If, as a result of the process executed in Step S260, it is judged in Step S270 that the engine may be automatically stopped, the routine proceeds to Step S280. On the other hand, if it is judged that the engine should not be automatically stopped, the routine ends.

In Step S280, automatic stop of the engine is executed by the idling stop control section 20, and the routine then proceeds to Step S290.

In Step S290, the subroutine for the automatic engine start determination process, illustrated in FIG. 6, is executed to determine whether or not the engine needs to be automatically started from the idling stop state. The routine then proceeds to Step S300.

If, as a result of the process executed in Step S290, it is judged in Step S300 that the engine needs to be automatically started, the routine proceeds to Step S310. On the other hand, if it is judged that the engine need not be automatically started, the routine returns to Step S280.

In Step S310, automatic start of the engine is executed by the idling stop control section 20, whereupon the routine ends.

FIG. 5 is a flowchart illustrating the subroutine for the automatic engine stop determination process.

As illustrated in FIG. 5, whether the battery is in a degraded state or not is determined first in Step S400 of the automatic engine stop determination process. Specifically, it is determined whether or not the internal resistance of the battery of the vehicle is lower than 10 mΩ. If the internal resistance is lower than 10 mΩ, it is judged that the battery is not degraded, and the subroutine proceeds to Step S410.

In Step S410, it is determined whether or not the state of charge of the battery is sufficiently high. Specifically, it is determined whether or not the battery of the vehicle shows a state of charge higher than or equal to 80%. If the state of charge of the battery is higher than or equal to 80%, it is judged that the state of charge of the battery is sufficiently high, and the subroutine proceeds to Step S420.

In Step S420, it is determined whether or not operation of the air conditioner is being demanded. Specifically, it is determined whether or not the switch for operating the air conditioner is turned OFF. If the switch is OFF, it is judged that operation of the air conditioner is not demanded, and the subroutine proceeds to Step S430.

In Step S430, it is determined whether or not the engine 11 is in a warmed state. Specifically, it is determined whether or not the cooling water temperature input from the cooling water temperature sensor 5 indicates a temperature higher than or equal to 60 degrees Celsius. If the cooling water temperature is higher than or equal to 60 degrees Celsius, it is judged that the engine 11 is in a warmed state, and the subroutine proceeds to Step S440.

In Step S440, it is determined whether or not the hydraulic pressure in the master cylinder of the service brake of the vehicle is sufficiently high. Specifically, it is determined whether or not the hydraulic pressure P in the brake master cylinder input from the brake pressure sensor 4 indicates a pressure higher than or equal to a reference brake pressure Ps (first reference pressure, e.g., 0.5 MPa). If the hydraulic pressure P of the master cylinder is higher than or equal to the reference brake pressure Ps, it is judged that the hydraulic pressure P is sufficiently high, and the subroutine proceeds to Step S450.

In Step S450, it is determined whether or not the accelerator position input from the accelerator position sensor 6 indicates "0" (accelerator pedal released). If the accelerator position is "0", the subroutine proceeds to Step S460.

In Step S460, it is concluded that automatic stop of the engine may be executed, whereupon the subroutine returns to the main routine.

The subroutine proceeds to Step S470 if it is judged in Step S400 that the internal resistance of the battery is higher than or equal to 10 mΩ, if it is judged in Step S410 that the state of charge of the battery is lower than 80%, if it is judged in Step S420 that the switch for operating the air conditioner is turned ON, if it is judged in Step S430 that the temperature of the engine cooling water is lower than 60 degrees Celsius, if it is judged in Step S440 that the hydraulic pressure in the brake master cylinder is lower than 0.5 MPa, or if it is judged in Step S450 that the accelerator position indicates a value greater than "0".

In Step S470, it is concluded that automatic engine stop should not be executed, whereupon the subroutine returns to the main routine.

FIG. 6 is a flowchart illustrating the subroutine for the automatic engine start determination process.

As illustrated in FIG. 6, first, whether the state of charge of the battery is sufficiently high or not is determined in Step S500 of the automatic engine start determination process. Specifically, it is determined whether or not the battery of the vehicle shows a state of charge higher than or equal to 80%. If the state of charge of the battery is higher than or equal to 80%, it is judged that the state of charge of the battery is sufficiently high, and the subroutine proceeds to Step S510.

In Step S510, it is determined whether or not operation of the air conditioner is being demanded. Specifically, it is determined whether or not the switch for operating the air conditioner is turned OFF. If the switch is OFF, it is judged that operation of the air conditioner is not demanded, and the subroutine proceeds to Step S520.

In Step S520, it is determined whether or not the engine 11 is in a warmed state. Specifically, it is determined whether or not the cooling water temperature input from the cooling water temperature sensor 5 indicates a temperature higher than or equal to 60 degrees Celsius. If the cooling water temperature is higher than or equal to 60 degrees Celsius, it is judged that the engine 11 is in a warmed state, and the subroutine proceeds to Step S530.

In Step S530, it is determined whether or not the hydraulic pressure in the master cylinder of the service brake is sufficiently high. Specifically, it is determined whether or not the hydraulic pressure P in the brake master cylinder input from the brake pressure sensor 4 indicates a pressure higher than or equal to the reference brake pressure Ps (e.g., 0.5 MPa). If the hydraulic pressure P of the brake master cylinder is higher than or equal to the reference brake pressure Ps, it is judged that the hydraulic pressure P is sufficiently high, and the subroutine proceeds to Step S540.

In Step S540, it is determined whether or not the accelerator position indicates "0" (accelerator pedal released). If the accelerator position is "0", the subroutine proceeds to Step S550.

In Step S550, it is concluded that automatic start of the engine is unnecessary, whereupon the subroutine returns to the main routine.

The subroutine proceeds to Step S560 if it is judged in Step S500 that the state of charge of the battery is lower than 80%, if it is judged in Step S510 that the switch for operating the air conditioner is turned ON, if it is judged in Step S520 that the temperature of the engine cooling water is lower than 60 degrees Celsius, if it is judged in Step S530 that the hydraulic pressure P in the brake master cylinder is lower than the reference brake pressure Ps, or if it is judged in Step S540 that the accelerator position indicates a value greater than "0".

In Step S560, it is concluded that automatic engine start needs to be executed, whereupon the subroutine returns to the main routine.

FIG. 7 is a flowchart illustrating the subroutine for the neutral-at-idle determination process.

As illustrated in FIG. 7, whether the engine 11 is in a warmed state or not is determined first in Step S600 of the neutral-at-idle determination process. Specifically, it is determined whether or not the cooling water temperature input from the cooling water temperature sensor 5 indicates a temperature higher than or equal to 60 degrees Celsius. If the cooling water temperature is higher than or equal to 60 degrees Celsius, it is judged that the engine 11 is in a warmed state, and the subroutine proceeds to Step S610.

In Step S610, it is determined whether or not the hydraulic pressure in the master cylinder of the service brake is sufficiently high. Specifically, it is determined whether or not the hydraulic pressure P in the brake master cylinder input from the brake pressure sensor 4 indicates a pressure higher than or equal to a reference brake pressure Pn (second reference pressure, e.g., 0.2 MPa). If the hydraulic pressure P of the brake master cylinder is higher than or equal to the reference brake pressure Pn, it is judged that the hydraulic pressure P is sufficiently high, and the subroutine proceeds to Step S620.

In Step S620, it is determined whether or not the accelerator position input from the accelerator position sensor 6 indicates "0" (accelerator pedal released). If the accelerator position is "0", the subroutine proceeds to Step S630.

In Step S630, it is concluded that the neutral-at-idle control may be executed, whereupon the subroutine returns to the main routine.

The subroutine proceeds to Step S640 if it is judged in Step S600 that the temperature of the engine cooling water is lower than 60 degrees Celsius, if it is judged in Step S610 that the hydraulic pressure P in the brake master cylinder is lower than the reference brake pressure Pn, or if it is judged in Step S620 that the accelerator position indicates a value greater than "0".

In Step S640, it is concluded that the neutral-at-idle control should not be executed, whereupon the subroutine returns to the main routine.

FIG. 8 is a flowchart illustrating the subroutine for the neutral-at-idle cancellation determination process.

As illustrated in FIG. 8, first, whether the engine 11 is in a warmed state or not is determined in Step S700 of the neutral-at-idle cancellation determination process. Specifically, it is determined whether or not the cooling water temperature input from the cooling water temperature sensor 5 indicates a temperature higher than or equal to 60 degrees Celsius. If the cooling water temperature is higher than or equal to 60 degrees Celsius, it is judged that the engine 11 is in a warmed state, and the subroutine proceeds to Step S710.

In Step S710, it is determined whether or not the hydraulic pressure in the master cylinder of the service brake is sufficiently high. Specifically, it is determined whether or not the hydraulic pressure P in the brake master cylinder input from the brake pressure sensor 4 indicates a pressure higher than or equal to the reference brake pressure Pn (e.g., 0.2 MPa). If the hydraulic pressure P of the brake master cylinder is higher than or equal to the reference brake pressure Pn, it is judged that the hydraulic pressure P is sufficiently high, and the subroutine proceeds to Step S720.

In Step S720, it is determined whether or not the accelerator position input from the accelerator position sensor 6 indicates "0" (accelerator pedal released). If the accelerator position is "0", the subroutine proceeds to Step S730.

In Step S730, it is concluded that cancellation of the neutral-at-idle control is unnecessary, whereupon the subroutine returns to the main routine.

The subroutine proceeds to Step S740 if it is judged in Step S700 that the temperature of the engine cooling water is lower than 60 degrees Celsius, if it is judged in Step S710 that the hydraulic pressure P in the brake master cylinder is lower than the reference brake pressure Pn, or if it is judged in Step S720 that the accelerator position indicates a value greater than "0".

In Step S740, it is concluded that the neutral-at-idle control needs to be cancelled, whereupon the subroutine returns to the main routine.

In this embodiment, the aforementioned control procedure is followed, so that execution of the neutral-at-idle control is prohibited while the time Ts elapsed from the stoppage of the vehicle is shorter than or equal to the predetermined time Ts1. Accordingly, when both of the idling stop condition and the shift-into-neutral condition are fulfilled immediately after the vehicle stops moving, the idling stop control is executed while execution of the neutral-at-idle control is prohibited.

As illustrated in FIG. 7, the number of items set with respect to the shift-into-neutral condition is smaller than that set with respect to the idling stop condition, illustrated in FIG. 5. That is to say, the shift-into-neutral condition is more likely to be fulfilled than the idling stop condition. Thus, if execution of the neutral-at-idle control is not prohibited immediately after stoppage of the vehicle as in the conventional control device, a situation can arise where the shift-into-neutral condition is first fulfilled immediately after the stoppage of the vehicle, so that the neutral-at-idle control is executed, and then the idling stop condition is fulfilled, resulting in a switchover of control mode to the idling stop control. However, such switchover entails a time lag, and thus even if the idling stop condition is fulfilled immediately after the shift-into-neutral condition is fulfilled, it is difficult to switch the control mode to the idling stop control in a moment.

According to the embodiment, while the post-stoppage elapsed time Ts is shorter than or equal to the predetermined time Ts1, execution of the neutral-at-idle control is prohibited as stated above. Accordingly, when the idling stop condition is fulfilled immediately after the vehicle stops running, the idling stop control can be executed smoothly without the neutral-at-idle control being executed. The idling stop control, which provides a superior fuel efficiency improving effect, can therefore be promptly executed immediately after stoppage of the vehicle, making it possible to improve fuel efficiency.

Also, after the predetermined time Ts is exceeded by the post-stoppage elapsed time Ts, the idling stop control is preferentially executed when the idling stop condition is fulfilled, even if the neutral-at-idle control is being executed. This increases opportunities of executing the idling stop control, which is superior in the fuel efficiency improving effect, making it possible to further improve fuel efficiency.

In the foregoing embodiment, the reference brake pressures Ps and Pn are used as criterion thresholds for the brake pressure P, which is an item included in the idling stop condition and the shift-into-neutral condition. The reference brake pressures Ps and Pn may be set so as to vary in accordance with the road surface gradient θ detected by the inclination angle sensor 3, namely, the gradient of the road surface. For example, the reference brake pressures Ps and Pn may be increased with increase in the road surface gradient θ. By setting the reference brake pressures Ps and Pn in this manner, it is possible to ensure safety of the vehicle standing on inclined ground and also to improve fuel efficiency by increasing opportunities of executing the idling stop control and the neutral-at-idle control when the vehicle is standing on flat ground. Further, the need for execution of the idling stop control and the neutral-at-idle control can be appropriately determined in accordance with the road surface gradient θ.

Also, the reference brake pressures Ps and Pn, which are set in accordance with the road surface gradient θ and used for determining fulfillment of the idling stop condition and the shift-into-neutral condition, respectively, may be set to respective different values as exemplified in the above embodiment. This permits the reference brake pressures to be set so as to be suited for the idling stop control and the neutral-at-idle control, respectively, whereby the need for initiation of the idling stop control and the neutral-at-idle control can be appropriately determined.

For example, the reference brake pressure Ps used for determining fulfillment of the idling stop condition may be set to be higher than the reference brake pressure Pn used for determining fulfillment of the shift-into-neutral condition. In this case, with regard to the hydraulic pressure P in the brake master cylinder, the shift-into-neutral condition is easier to be fulfilled than the idling stop condition, and it is thus possible to increase opportunities of executing the idling stop control and the neutral-at-idle control while securing appropriate brake force matching the road surface gradient θ.

Further, the reference brake pressure Ps used for determining the need for execution of the idling stop control may be set in such a manner that the reference brake pressure Ps set during the period of the predetermined time Ts1 after stoppage of the vehicle is lower than the reference brake pressure Ps set after the lapse of the predetermined time Ts1. Where the reference brake pressure Ps is set in this manner, the idling stop condition is easier to be fulfilled immediately after stoppage of the vehicle than after the lapse of the predetermined time. Consequently, the idling stop control is more likely to be executed immediately after the vehicle is stopped, making it possible to further increase opportunities of executing the idling stop control which provides a superior fuel efficiency improving effect.

What is claimed is:

1. A control device for a motor vehicle, comprising:
an idling stop controller for stopping operation of an internal combustion engine mounted as a drive source on the vehicle when a predetermined stopping condition is fulfilled;
a neutral-at-idle controller for shifting a transmission of the vehicle into neutral when a predetermined shift-into-neutral condition is fulfilled;
a vehicle speed sensor that detects whether the motor vehicle has stopped moving;
a standing time measuring unit that starts counting time when the vehicle speed sensor detects that the vehicle has stopped moving;
a control unit that determines whether or not the standing time measuring unit has counted a predetermined time, wherein,
(a) until the control unit determines that the standing time measuring unit has counted the predetermined time, the control unit controls only the idling stop controller to stop operation of the internal combustion engine if the predetermined stopping condition is fulfilled and prohibits shifting the transmission of the vehicle into neutral even if the predetermined shift-into-neutral condition is fulfilled, and
(b) after the control unit determines that the standing time measuring unit has counted the predetermined time, the control unit determines whether the predetermined shift-into-neutral condition is fulfilled and controls the neutral-at-idle controller to shift the transmission of the vehicle into neutral if the predetermined shift-into-neutral condition is fulfilled.

2. The control device according to claim 1, wherein:
if the predetermined stopping condition is not fulfilled during the predetermined time and the engine keeps operating past the predetermined time, shifting of the transmission into neutral is executed by the neutral-at-idle controller when the predetermined shift-into-neutral condition is fulfilled.

3. The control device according to claim 2, wherein:
if the predetermined stopping condition is fulfilled after shifting of the transmission into neutral is executed by the neutral-at-idle controller because of fulfillment of the predetermined shift-into-neutral condition, operation of the engine is stopped by the idling stop controller.

4. The control device according to claim 1, further comprising:
a road surface gradient detector configured to detect a gradient of a road surface on which the vehicle is standing; and
a brake pressure detector configured to detect an operating fluid pressure of a service brake of the vehicle,
wherein the predetermined stopping condition for activating the idling stop controller includes a conditional state in which the operating fluid pressure detected by the brake pressure detector is higher than a first reference pressure set in accordance with the gradient detected by the road surface gradient detector, and
wherein the predetermined shift-into-neutral condition for activating the neutral-at-idle controller includes a conditional state in which the operating fluid pressure of the service brake of the vehicle is higher than a second reference pressure set in accordance with the gradient detected by the road surface gradient detector.

5. The control device according to claim 4, wherein:
the first reference pressure is set to be higher than the second reference pressure.

6. The control device according to claim 4, wherein:
the first reference pressure is set so as to be lower when the elapsed time measured by the standing time measuring unit is shorter than or equal to the predetermined time than when the predetermined time is exceeded by the elapsed time.

7. The control device according to claim 4, wherein:
if the gradient detected by the road surface gradient detector is greater than or equal to a predetermined gradient, stop of the engine by the idling stop controller and shifting of the transmission into neutral by the neutral-at-idle controller are both prohibited.

8. The control device according to claim 1, wherein:
the predetermined shift-into-neutral condition includes at least a conditional state in which the vehicle is stopped, and
the predetermined stopping condition includes at least a conditional state in which the vehicle is stopped and a battery of the vehicle is in a predetermined state.

9. The control device according to claim 1, wherein:
the predetermined shift-into-neutral condition includes at least a conditional state in which the vehicle is stopped, and
the predetermined stopping condition includes at least a conditional state in which the vehicle is stopped and an air conditioner of the vehicle is in a predetermined operating state.

* * * * *